United States Patent
Felbecker et al.

(10) Patent No.: US 7,903,626 B2
(45) Date of Patent: Mar. 8, 2011

(54) CHANNEL QUALIFICATION AND SELECTION IN A MULTICHANNEL RADIO SYSTEM BY PACKET ERROR RATE MEASUREMENT

(75) Inventors: Britta Felbecker, München (DE); Roland Hellfajer, Bochum (DE); Alexander Uwah, Mülheim (DE)

(73) Assignee: Infineon Technologies AG, Munich (DE)

( * ) Notice: Subject to any disclaimer, the term of this patent is extended or adjusted under 35 U.S.C. 154(b) by 1261 days.

(21) Appl. No.: 10/834,445

(22) Filed: Apr. 29, 2004

(65) Prior Publication Data
US 2005/0005227 A1    Jan. 6, 2005

(30) Foreign Application Priority Data
May 6, 2003 (DE) .................................. 103 20 157

(51) Int. Cl.
*H04J 1/00* (2006.01)
(52) U.S. Cl. ........................................ 370/343; 370/470
(58) Field of Classification Search .................. None
See application file for complete search history.

(56) References Cited

U.S. PATENT DOCUMENTS

| | | | | |
|---|---|---|---|---|
| 5,754,586 | A * | 5/1998 | Carsello | 375/213 |
| 6,704,346 | B1 * | 3/2004 | Mansfield | 375/136 |
| 6,859,463 | B1 * | 2/2005 | Mayor et al. | 370/445 |
| 6,928,085 | B2 * | 8/2005 | Haartsen | 370/462 |
| 6,978,143 | B1 * | 12/2005 | Vialen | 455/452.2 |
| 7,012,902 | B2 * | 3/2006 | Omi et al. | 370/310.1 |
| 7,016,651 | B1 * | 3/2006 | Narasimhan | 455/67.11 |
| 7,062,687 | B1 * | 6/2006 | Gfeller et al. | 714/704 |
| 2003/0058829 | A1 * | 3/2003 | Batra | 370/345 |
| 2003/0117972 | A1 * | 6/2003 | Vimpari | 370/328 |
| 2003/0126492 | A1 * | 7/2003 | Cavin | 714/4 |
| 2004/0052214 | A1 * | 3/2004 | Teh et al. | 370/238 |
| 2005/0058065 | A1 * | 3/2005 | Tiller et al. | 370/229 |
| 2006/0109889 | A1 * | 5/2006 | Kim | 375/133 |

FOREIGN PATENT DOCUMENTS

| | | |
|---|---|---|
| DE | 101 23 639 A1 | 11/2001 |
| EP | 1 320 210 A2 | 6/2003 |

\* cited by examiner

*Primary Examiner* — Seema S Rao
*Assistant Examiner* — Rhonda Murphy
(74) *Attorney, Agent, or Firm* — Eschweller & Associates, LLC

(57) ABSTRACT

In a method for channel qualification and selection, an actual data packet length and a data packet error rate in a received data packet are determined, and are used for a qualification decision. The measured data packet error rate is compared with a previously calculated data packet error threshold value, which depends on an assumed bit error rate and the ratio of a possible actual to a maximum data packet length.

7 Claims, 1 Drawing Sheet

CHANNEL QUALIFICATION AND SELECTION IN A MULTICHANNEL RADIO SYSTEM BY PACKET ERROR RATE MEASUREMENT

REFERENCE TO RELATED APPLICATIONS

This application claims the benefit of the priority date of German application DE 103 20 157.2, filed on May 6, 2003, the contents of which are herein incorporated by reference in their entirety.

FIELD OF THE INVENTION

The invention relates to a method for qualification of the transmission quality of a frequency channel in a radio system, in particular in a wire-free communication system that uses a frequency hopping method, and to a method for corresponding selection of a qualified frequency channel.

BACKGROUND OF THE INVENTION

In the case of radio systems, particularly in the case of wire-free communication systems, which allow frequency spreading by transmission of data on different transmission channels (for example frequency hopping in the case of Bluetooth), it is possible to mask out specific transmission channels in order in this way to avoid interference influences on the transmission. In the case of the so-called adaptive frequency hopping method (AFH), the masking out of the transmission channels is automatic and matched to the frequency channel.

In general, a distinction is drawn between two approaches for such classification and qualification of a frequency channel, and one of these two approaches is selected for masking out a frequency channel. In a first approach, the connection (for example Bluetooth) to be adapted is changed such that there is no interference with a further connection (for example WLAN=Wireless Local Area Network). In the second approach, the procedure is for the connection (for example Bluetooth) to be adapted to be changed such that any possible interference from another connection has as little interference influence as possible. In this second approach, for example, an assessment of the bit or data packet error rate on the channels may be used for this purpose. In the first approach described above, the field strength can be determined at times at which the connection to be adapted is not active, in order in this way to obtain information about the activity and the use of the transmission channel by another radio system.

The data packet type which is used in radio systems, in particular in wire-free communication systems such as Bluetooth, DECT, etc., and thus also the maximum length of the data packets are dependent on the given and instantaneous operating conditions, as well as on the settings of a host system. These are governed inter alia by the current number of open connections, the presence of speech channels etc. The settings of the host system and the operating conditions may vary and therefore do not always exist in such a way that data packets with the maximum overall length can always be received. It is thus also possible for the length of the data packets to vary within or during a measurement interval that is used for frequency channel classification. This means that an interference component in a frequency channel can be determined only relatively inaccurately, so that the decision to mask out a frequency channel or to use it for data transmission is relatively inaccurate and unreliable.

A method for channel selection and for digital data transmission via a wire-free communication link is known from German Laid-Open Specification DE 101 23 639A1. In this case, two or more channels are provided for data transmission, via which a first and a second transmitting/receiver unit communicate without the use of wires. The digital data communication via a wire-free communication link is provided by means of data packets that are transmitted sequentially via two or more frequency channels. The communication quality of each frequency channel is recorded, and is compared with a quality criterion that can be predetermined. Channels with an inadequate communication quality are replaced by previously unused channels, and/or the set of control data which is contained in each data packet is selected as a function of the recorded overall quality of the communication link. In the case of the methods that are used in a cordless telephone system, only one general quality figure is determined for one frequency channel, and is compared with a quality criterion. The decision as to whether a frequency channel is thus used for data transmission or is masked out can thus be made only very inadequately and with little confidence. Furthermore, in this known method, one or more transmission channels is or are selected first of all, and only after this is the data packet type with which the corresponding data will be transmitted selected. No information about data packet structures and data packet characteristics is thus used in the quality figure for a frequency channel. Thus, with these known methods, the interference component on a frequency channel and whether the frequency channel is identified and classified as an interference source can be determined only very unsatisfactorily.

SUMMARY OF THE INVENTION

One object of the invention is to provide a method which makes it possible to improve the qualification of the transmission quality of a frequency channel. A further object of the invention is to make it possible to ensure that a frequency channel is selected reliably and with high probability.

In a method according to the invention for qualification of the transmission quality of a frequency channel in a radio system, in-particular in a mobile radio system, at least two units in the radio system communicate by means of packet-based data transmission without the use of wires via the frequency channel. One major idea of the invention is to determine a data packet error rate and an actual data packet length of a received data packet, and to use them for a selection decision for the frequency channel. Thus, in the method according to the invention, two parameters are determined, for which it has been found that they contribute as essential information to the determination of the interference components, and are employed for accurate determination and measurement of the interference component, and are thus major factors for qualification of the frequency channel. Account is therefore taken of the identified relationship, which is highly dependent on the packet length, between a measured data packet error rate for data packets and the quality of the frequency channel. The transmission quality of a frequency channel in a radio system can thus be determined very accurately, so that it is possible to determine with a very high degree of probability whether a frequency channel should be masked out and should thus not be used for data transmission, or whether it should be selected for data transmission.

The following steps are advantageously carried out for qualification of the transmission quality of the frequency channel:

a) storage of data packet error threshold values which are calculated in advance as a function of the ratio between an actual and a maximum data packet length;
b) determination of the actual data packet length, of the maximum possible data packet length and of the data packet error rate; and
c) qualification of the frequency channel on the basis of the data packet error threshold value which is stored in step a).

The relationship in step a) is preferably stepped (i.e., the functional relationship is a stepwise functional relationship) and, in one particular example, is stored in the form of a table. One or more previously assumed values of bit error rates and various values of possible actual data packet lengths are preferably used for the prior calculation of the data packet error rates that are used as data packet error threshold values. Since the threshold values used are based on values of data packet error rates that have been calculated in advance, the calculation complexity for the actual classification of a frequency channel and the determination of the quality of a frequency channel can be considerably reduced. Depending on the requirement profile for a radio system, this allows an appropriate calculation to be carried out individually and matched to a radio system. Furthermore, this allows relatively cost-effective and, in addition, faster determination and calculation of the interference components on a frequency channel and of possible masking out, associated with this, of this frequency channel, to be carried out.

The data packet error rates for two or more different data packet lengths of the data packet are preferably calculated in advance. This makes it possible to determine and produce an error pattern, which may be refined, resolved or graduated in many ways. The limit value or threshold value which allows a qualification statement when carrying out a comparison process may be defined very exactly by means of these data packet errors calculated in advance, or may be predetermined by them. Furthermore, the computation complexity can be considerably reduced and decreased.

Furthermore, it is advantageous if, in step b), the actual data packet length is determined by measurement of data symbols which are received within one measurement interval and parts of this number of measured data symbols are determined by the number of data packets which are received within the measurement interval.

In step b), it is advantageous to determine the maximum possible data packet length by reading the corresponding information that is contained in the data packet header.

In step b), a data packet error is preferably determined by evaluation of the error code information which is contained in the data packet, in particular of the CRC code block, and a data packet error rate is determined from the number of data packet errors within a predetermined time interval.

In step c), the determined data packet error rate is advantageously compared with the previously calculated and stored data packet error threshold value.

A further aspect of the invention relates to a method for selection of a frequency channel in a radio system, in which the frequency channel is qualified using the method according to the invention, or this qualification method according to the. invention is extended in an advantageous manner.

When selecting a frequency channel, a frequency channel is advantageously blocked for data transmission when the measured data packet error rate exceeds the stored data packet error threshold value. By setting this threshold value, or by calculating this threshold value as defined above, it is possible to ensure virtually interference-free data transmission by preventing the availability or use for data transmission of all of those transmission channels whose interference component is too high or which would cause unacceptable interference with data transmission.

One particularly advantageous embodiment relates to a frequency hopping method, in particular an adaptive frequency hopping method, in which data is transmitted via two or more frequency channels which are provided, and one frequency channel is selected using a method for selection of a frequency channel, in which a frequency channel is qualified by means of the method according to the invention, or by an advantageous extension to it. In the case of radio systems, in particular in the case of mobile radio systems, which allow frequency spreading by transmitting and/or receiving on different transmission channels, it is thus particularly advantageously possible to ensure data transmission with as little interference as possible by masking out those transmission channels for data transmission whose interference component is too high.

It is advantageous for the data to be transmitted or received in time slots in a time pattern that is based on a radio standard.

Data is advantageously transmitted or received by means of a time slot method that is based on the radio standard. They can be Bluetooth Standard, DECT or WDCT may be mentioned as examples of radio standards for wire-free communication. However, in principle, the method is also applicable to mobile radio standards such as GSM or GSM/EDGE.

DETAILED DESCRIPTION OF THE INVENTION

Figure 1:
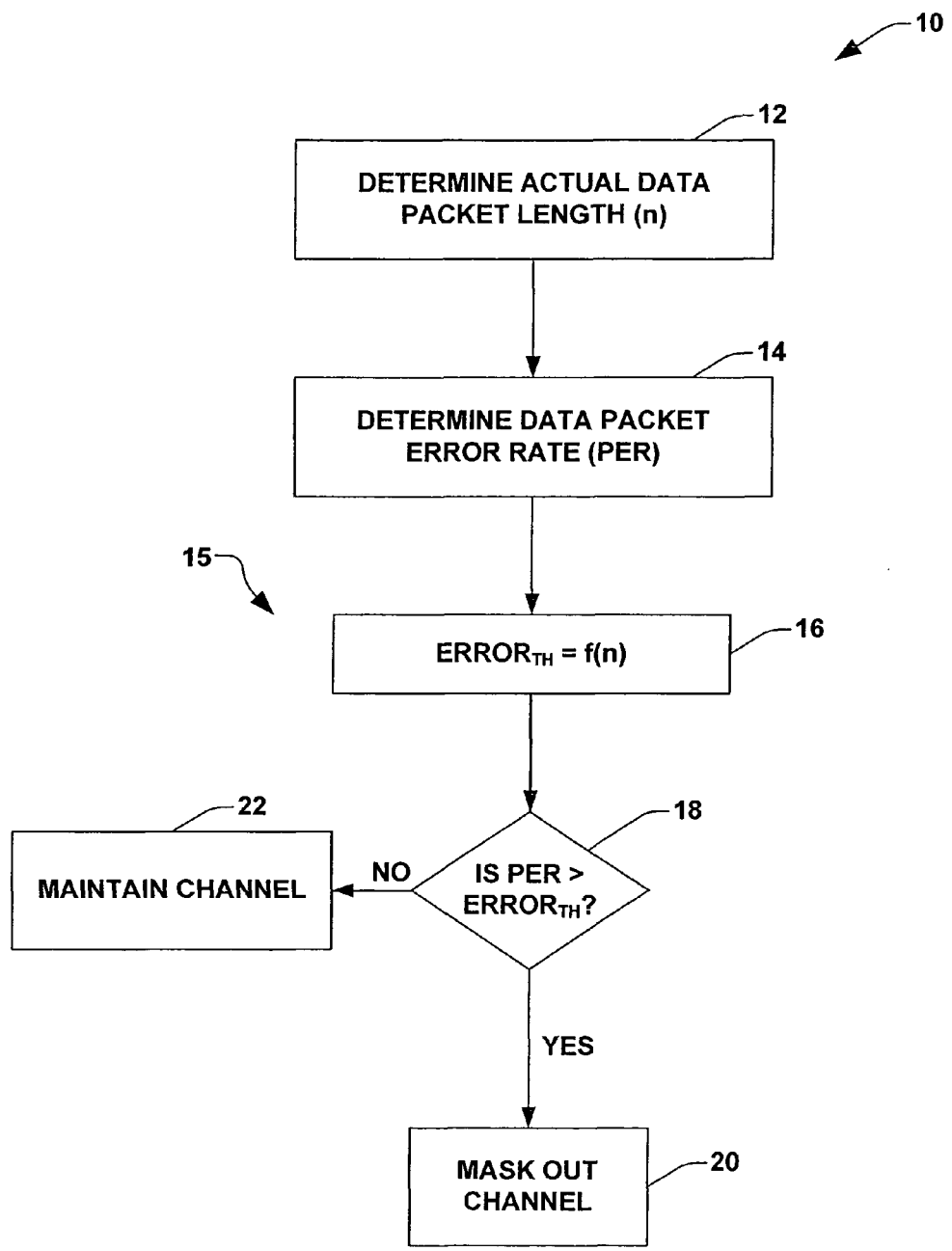
FIG. 1 is a flow chart diagram illustrating a method of qualifying the transmission quality of a frequency channel in accordance with one aspect of the present invention.

One exemplary embodiment of the method according to the invention will be explained in more detail in the following text, in conjunction with FIG. 1.

Two or more transmission channels are provided for the transmission of data in a mobile radio system. The mobile radio system operates using an adaptive frequency hopping method and allows frequency spreading by transmission on these different transmission channels. Furthermore, this adaptive frequency hopping method operates using a time slot method. In the time slot method, transmission and reception take place in time slots that are provided appropriately for this purpose, and are possible only in these time slots.

If it is assumed that the interference with a radio-frequency channel is distributed in the same way over time, that is to say that the bit error rate that is produced and is to be assumed is constant over time, then the measured data packet error rate for data packets is dependent on the interference on the channel and, in particular, is also dependent on the length of the data packet. The relationship between the data packet error rate PER and an assumed bit error rate BER of the frequency channel is as follows:

$$PER = 1 - (1-BER)^n$$

where n denotes the length of a data packet.

As already stated, the data packet type which is used in mobile radio systems and hence also the length of the data packets, are dependent on the settings in the host system and on the current operating conditions. In this case it can be assumed that data packets with a maximum overall length cannot be received and in particular, as well, the length of data packets may vary within a measurement interval for frequency channel qualification.

In the case of received data packets which are not completely full, that is to say the length of the data packet does not correspond to the maximum length of the data packet type being used, if a low data packet error rate PER is measured, then this data packet error rate PER does not reflect the actual interference or the actual interference component on the frequency channel. This is because it would also be possible for the data packet error rate PER to be low as a result of the fact that little data has been received.

Thus, the present invention comprises a method 10, as illustrated in FIG. 1, wherein the number of received characters, that is to say the actual data packet length, in the measurement interval, is also measured at 12, in addition to the data packet error rate PER 14, for frequency channel classification or qualification at 15 according to the invention.

Such qualification 15 may comprise comparing the packet error rate (PER) to a data packet error threshold value that is a function of the actual data packet length (n) at 18. The data packet error threshold value (ERRORTH) may be a differing value based on the actual data packet length (n), as discussed supra. If the PER exceeds the threshold value ERRORTH (YES at 18), then that frequency channel is masked out at 20 and not subsequently employed in the adaptive frequency hopping methodology. If, however, the packet error rate (PER) does not exceed the threshold value (NO at 18), then the frequency channel is maintained and available subsequently in the adaptive frequency hopping methodology.

Furthermore, in the method 10, the number of received data packets may be used to calculate a mean data packet length, which then allows mapping onto the actual interference on the frequency channel in accordance with the formula mentioned above, which describes the relationship between the data packet error rate PER and an assumed bit error rate BER on a frequency channel.

The maximum length of a received data packet is coded in the data packet header itself, and can thus be read directly. The measurement and determination of both the actual data packet length as well as the data packet error rate PER of a received data packet thus make it possible to measure and determine the frequency channel quality considerably more exactly. Account is thus taken of the significant relationship, which is dependent on the packet length, between the frequency channel quality and the measured data packet error rate PER for data packets that are not protected by an error correction code.

The determined information with regard to the length of the data packets and the data packet error rate PER thus allows a more accurate assessment of whether a frequency channel should be used for data transmission.

The relationship described in the formula quoted above between the data packet error rate PER and the assumed bit error rate BER on a frequency channel is logarithmic, so that calculation of the actual frequency channel quality for any given filling level is highly computationally intensive. The filling level of a data packet is the actual length of a data packet in comparison to the maximum possible length of a data packet. A data packet error threshold value is thus calculated in advance as a function of the filling level and thus as a function of the ratio of a possible assumed data packet length to the maximum possible data packet length. It is thus possible to provide for equivalent assumed data packet error rate values PER to be calculated in advance for various filling levels of a received data packet. For example, the values may be calculated for 25%, 50%, 75% and 100% filling. However, in addition to or instead of this, it is also possible to calculate values for other filling levels. This makes it possible to produce a table that has values of the data packet error rate PER for which any resolution or graduation may be defined. This fine breakdown of the table by listing two or more values for the data packet error rate for various filling levels of a received data packet allows the limit value for the decision as to whether the transmission quality on a frequency channel is sufficient for data transmission to be determined relatively accurately and reliably.

Selection of a frequency channel which has been qualified in this way can thus be decided and implemented considerably more accurately and reliably. Furthermore, the computation complexity is considerably reduced by the provision of data packet error rate values PER which have been calculated in advance and stored and are used as data packet error threshold values.

By way of example, structures that comprise 128 bits of speech data and 16 bits of control data may be used as data packet types. It is also possible to use structures which represent a control data packet comprising 80 bits and with no speech data. A control data packet such as this comprises 80 bits of data, of which 16 bits are intended for synchronization, 8 bits for the packet header part, 40 bits for the content and 16 bits for the CRC (Cyclic Redundancy Check).

In the method according to the invention for frequency channel qualification and for selection of a frequency channel for a radio system, the actual data packet length and the number of received symbols in a received data packet are determined in addition to the data packet error rate, and are used for a qualification decision on a frequency channel. This additional information about the length of the received data packets allows the transmission quality of a frequency channel to be qualified on a considerably improved basis. A frequency channel that has been qualified in this way can thus be selected with considerably better accuracy and reliability. The information about a data packet, in particular the actual data packet length and the data packet error rate, is thus included as a significant parameter in the decision-making process for selection of a frequency channel for data transmission. The relationship, which is highly dependent on the packet length, between a measured data packet error rate for data packets and the frequency channel quality is taken into account in the method according to the invention.

The invention claimed is:

1. A method for qualification of the transmission quality of a frequency channel in a wire-free communication system which uses frequency hopping and in which at least two units in the communication system communicate without the use of wires by means of packet-based data transmission, comprising:

qualifying the transmission quality using an actual data packet length and a data packet error rate associated with the packet-based data transmission, wherein qualifying the transmission quality comprises deciding whether or not the frequency channel will be employed for subsequent data transmissions;

storing data packet error threshold values that are a function of a ratio between an actual and a maximum data packet length in a storage location; and determining a ratio of the actual data packet length and the maximum data packet length;

wherein qualifying the frequency channel further comprises comparing the data packet error rate with the data packet error threshold value associated with the determined ratio.

2. The method of claim 1, wherein the relationship between the ratio of the actual and maximum data packet length and the data packet error threshold value is stepped and stored in the data location in the form of a table.

3. The method of claim 1, wherein the actual data packet length is determined by measurement of the number of data symbols which are received within one measurement interval and dividing by the number of data packets that are received within the measurement interval.

4. The method of claim 1, wherein the maximum possible data packet length is determined by reading the corresponding information which is contained in the data packet header of the data transmission.

5. The method of claim 1, wherein a data packet error is determined by evaluating error code information that is contained in a CRC (Cyclic Redundancy Check) code block portion of the data packet, and a data packet error rate is determined from the number of data packet errors within a predetermined time interval.

6. The method of claim 1, wherein comparing further comprises comparing the determined data packet error rate with a previously calculated and stored data packet error threshold value.

7. A method for qualification of the transmission quality of a frequency channel in a wire-free communication system which uses frequency hopping and in which at least two units in the communication system communicate without the use of wires by means of packet-based data transmission, comprising:
- determining an actual data packet length of a data transmission on the frequency channel;
- determining a data packet error rate of the data transmission; and
- selectively qualifying the frequency channel based on the data packet length and the data packet error rate, wherein selectively qualifying the frequency channel comprises using the frequency channel for subsequent data transmission if the actual data packet length and data packet error rate satisfy a predetermined criteria;
- storing data packet error threshold values that are a function of a ratio between an actual and a maximum data packet length in a storage location; and
- determining a ratio of the actual data packet length and the maximum data packet length;
- wherein selectively qualifying the frequency channel further comprises comparing the data packet error rate with the data packet error threshold value associated with the determined ratio.

\* \* \* \* \*